(12) United States Patent
Oikawa

(10) Patent No.: US 7,522,843 B2
(45) Date of Patent: Apr. 21, 2009

(54) OPTICAL REPEATER CONVERTING WAVELENGTH AND BIT RATE BETWEEN NETWORKS

(75) Inventor: Yoichi Oikawa, Sapporo (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 12/193,199

(22) Filed: Aug. 18, 2008

(65) Prior Publication Data
US 2009/0028577 A1  Jan. 29, 2009

Related U.S. Application Data

(62) Division of application No. 10/941,918, filed on Sep. 16, 2004, now Pat. No. 7,424,227, which is a division of application No. 09/537,756, filed on Mar. 30, 2000, now Pat. No. 6,810,215.

(30) Foreign Application Priority Data

Jul. 15, 1999 (JP) ................. 11-201767

(51) Int. Cl.
H04J 14/02 (2006.01)
H04B 10/02 (2006.01)
(52) U.S. Cl. .................. 398/176; 398/175; 398/97
(58) Field of Classification Search .................. 398/95, 398/97, 174–176
See application file for complete search history.

(56) References Cited

U.S. PATENT DOCUMENTS

| | | | |
|---|---|---|---|
| 5,467,212 A | 11/1995 | Huber | |
| 5,576,875 A | 11/1996 | Chawki et al. | 398/72 |
| 5,859,725 A * | 1/1999 | Sugiya et al. | 359/337.13 |
| 5,938,309 A | 8/1999 | Taylor | |
| 5,940,196 A | 8/1999 | Piehler et al. | |
| 6,333,799 B1 | 12/2001 | Bala et al. | 398/9 |
| 6,339,488 B1 | 1/2002 | Beshai et al. | 398/59 |
| 6,388,782 B1 | 5/2002 | Stephens et al. | |
| 6,407,834 B1 | 6/2002 | Takeshita et al. | 398/175 |
| 6,426,815 B1 | 7/2002 | Koehler | 398/59 |
| 6,449,069 B1 | 9/2002 | Fujita | |
| 6,498,664 B1 | 12/2002 | Morita | 398/79 |
| 6,538,781 B1 | 3/2003 | Beierle et al. | |
| 6,778,730 B2 * | 8/2004 | Hironishi | 385/24 |

(Continued)

FOREIGN PATENT DOCUMENTS

JP  56-094894  7/1981

(Continued)

OTHER PUBLICATIONS

U.S. Appl. No. 10/941,918, filed Sep. 16, 2004, Yoichi Oikawa, Fujitsu Limited.

*Primary Examiner*—Dalzid Singh
(74) *Attorney, Agent, or Firm*—Staas & Halsey LLP

(57) ABSTRACT

An optical repeater which includes a wavelength converter and a bit rate converter. The wavelength converter converts a wavelength of an optical signal from a first optical network to a wavelength of a second optical network. The bit rate converter converts a bit rate of the optical signal from the first optical network to a bit rate of the second optical network. The optical repeater transmits the optical signal from the first optical network to the second optical network at the converted bit rate and wavelength.

6 Claims, 10 Drawing Sheets

U.S. PATENT DOCUMENTS 6,810,215 B1 10/2004 Oikawa
2001/0055135 A1* 12/2001 Sigloch .................. 359/124

FOREIGN PATENT DOCUMENTS

| | | |
|---|---|---|
| JP | 4-19622 | 1/1992 |
| JP | 4-213249 | 8/1992 |
| JP | 5-91548 | 4/1993 |
| JP | 7-30539 | 1/1995 |
| JP | 7-202906 | 8/1995 |
| JP | 7-202921 | 8/1995 |
| JP | 7-321744 | 12/1995 |
| JP | 8-47013 | 2/1996 |
| JP | 8-167877 | 6/1996 |

* cited by examiner

OPTICAL REPEATER CONVERTING WAVELENGTH AND BIT RATE BETWEEN NETWORKS

CROSS-REFERENCE TO RELATED APPLICATIONS

This application is a divisional application of Ser. No. 10/941,918, filed Sep. 16, 2004, now U.S. Pat. No. 7,424,227 which is a divisional of U.S. Ser. No. 09/537,756, filed Mar. 30, 2000, now U.S. Pat. No. 6,810,215 and claims priority to, Japanese Application No. 11-201767, filed Jul. 15, 1999, in Japan, all of which are incorporated herein by reference.

BACKGROUND OF THE INVENTION

1. Field of the Invention

The present invention relates to a repeater for connecting individual networks which together form a larger photonics network utilizing optical wavelength division multiplexing (WDM). More particularly, the present invention relates to a repeater which transmits an optical signal from a first network to a second network, and converts a bit rate and wavelength of the optical signal to that suitable for the second network.

2. Description of the Related Art

Optical wavelength division multiplexing (WDM) transmission systems are now under development to dramatically increase transmission capacity.

Moreover, it is intended to form an extensive photonics network by connecting different WDM transmission systems with each other. To achieve such a photonics network, various companies are developing optical add-drop multiplexers (OADM) for directly extracting and inserting an optical signal into an optical network, and optical cross-connects (OXC) for changing the path of an optical signal. For example, to provide a relatively reliable network configuration, an OADM or OXC could be used as a node in an extensive ring network.

In current WDM transmission systems in commercial use or that which will be put into practical use in near future, thirty-two (32) channels are multiplexed together, with 100 GHz signal channel space between the signals. Research and development will continue to increase the number of channels multiplexed together by narrowing the signal channel space and expanding the WDM signal wavelength band, to thereby greatly increase transmission capacity. For example, in future commercial systems, sixty-four (64) or one-hundred-twenty-eight (128) channels may be multiplexed together, and signal channel space may be narrowed to 50 GHz or 25 GHz.

FIG. 1 is a diagram illustrating a conventional optical network. Referring now to FIG. 1, optical add-drop multiplexers (OADM) 1-1, 1-2, 1-3 and 1-4 form nodes along an optical transmission path consisting of an optical fiber. Optical signals in the optical network are wavelength division multiplexed together.

FIG. 2 is a diagram illustrating a wavelength multiplexing process performed by each node 1-1, 1-2, 1-3 and 1-4, where an optical signal at a specific wavelength is branched from the transmission path, and a different optical signal at the specific wavelength is inserted into the transmission path.

Referring now to FIG. 2, a variable wavelength filter 11, such as an acusto-optical tunable filter (AOTF), is used to insert an optical signal of a particular wavelength into the transmission path. A variable wavelength filter 12, such as an AOTF, is used by each node 1-1, 1-2, 1-3 and 1-4 to branch the particular wavelength from the transmission path.

The signal wavelengths and bit rate of the optical network in FIGS. 1 and 2 might be different from that of other optical networks. Therefore, there may be difficulties when connecting such optical networks having different signal wavelengths and bit rates together.

Currently, the internationally standardized WDM signal wavelength is established at 155 µm band as the center frequency band with a channel space of 0.8 nm from 1535.8 nm, and at 195.2 THz in terms of the carrier frequency with a channel space of 100 GHz.

Currently, optical signal velocity (bit rate) is established at 2.5 Gb/s or 10 Gb/s, and manufacturers continue to develop an apparatus which can be connected to such signal velocities.

It is widely known that about three times the signal bit rate is enough for the signal frequency width. Therefore, when the bit rate is 10 Gb/s, the signal frequency width becomes about ±30 GHz.

In current systems, since the channel space is 100 GHz, the problem of crosstalk between adjacent channels will never be generated.

However, as indicated above, transmission capacity will be increased in future systems by increasing the number of channels (for example, to sixty-four (64) or one-hundred-twenty-eight (128)), narrowing the signal channel space (for example, to 50 GHz or 25 GHz) and expanding the WDM signal wavelength band. When the signal channel space is narrowed, a certain restriction will be given to the signal velocity (bit rate) from the point of view of signal frequency width.

If a special band compression technique is not introduced, the minimum signal channel space is assumed to become 100 GHz, for example, for 10 Gb/s and 25 Gb/s for 2.5 Gb/s.

TABLE 1

| bit rate(b/s) | 600 M | 2.5 G | 10 G | 40 G | note |
|---|---|---|---|---|---|
| bandwidth | ±1.8 GH | ±7.5 GHz | ±30 GHz | 120 GHz | bit rate x3 |
| minimum chan. space (wavelength space) | 6.25 GHz (0.05 nm) | 25 GHz (0.2 nm) | 100 GHz (0.8 nm) | 400 GHz (3.2 nm) | |

Bit rate and wavelength when ½" of the ITU grid 100 GHz channel space is applied.

Under this technical background, it is assumed that optical networks with different signal bit rates and signal channel spaces will be proposed. For example, one optical network might have characteristics of 10 Gb/s, 32 channels, 100 GHz channel space, while a different optical network might have characteristics of 2.5 Gb/s, 128 channels, 25 GHz channel space.

With optical networks having such different characteristics, the following problems may be assumed.

(1) Limitation on Signal Channel Space of Signal Frequency Width

For example, when a signal of 10 Gb/s is directly connected to the optical network of 250 GHz channel space, a problem is generated in which the crosstalk to the adjacent channel is generated by the signal frequency width of the signal of 10 Gb/s.

(2) Mismatch of Signal Frequency (Wavelength)

For example, when the optical network of 25 GHz channel space is connected to the optical network of 100 GHz, the signal might be changed to a signal which cannot be identified.

(3) Mismatch of Signal Velocity (Bit Rate)

When connecting optical networks of different signal bit rate, there may be a mismatch in the signal velocity of the different networks.

SUMMARY OF THE INVENTION

Accordingly, it is an object of the present invention to provide an apparatus, such as an optical repeater, which transmits an optical signal from a first optical network to a second optical network having different associated wavelengths and bit rates, and converts wavelength and/or bit rate of the optical signal to that suitable for the second optical network.

Additional objects and advantages of the invention will be set forth in part in the description which follows, and, in part, will be obvious from the description, or may be learned by practice of the invention.

The foregoing objects of the present invention are achieved by providing an optical repeater which includes a wavelength converter and a bit rate converter. The wavelength converter converts a wavelength of an optical signal from a first optical network to a wavelength of a second optical network. The bit rate converter converts a bit rate of the optical signal from the first optical network to a bit rate of the second optical network. The optical repeater transmits the optical signal from the first optical network to the second optical network at the converted bit rate and wavelength.

Objects of the present invention are also achieved by providing an optical repeater which includes: (a) a first optical coupler branching an optical signal from a node of a first optical network into a plurality of optical signals; (b) a plurality of optical filters extracting the plurality of optical signals, respectively; (c) a plurality of optical/electrical converters converting the extracted plurality of optical signals into a plurality of electrical signals, respectively; (d) a multiplexer multiplexing the plurality of electrical signals together into a multiplexed signal; and (e) a modulator modulating an optical signal of a specific wavelength with the multiplexed signal, the modulated optical signal being output to a node of a second optical network.

Further, objects of the present invention are achieved by providing an optical repeater which includes: (a) an optical/electrical converter converting an optical signal from a node of a first optical network into an electrical signal; (b) a demultiplexer demultiplexing the electrical signal into a plurality of electrical signals; (c) a plurality of optical modulators optically modulating a plurality of optical signals at specific wavelengths with the plurality of electrical signals, respectively, to produce a plurality of modulated optical signals; and (d) an optical coupler multiplexing the plurality of modulated optical signals together to produce a multiplexed signal which is output to a node of a second optical network.

Further, objects of the present invention are achieved by providing an optical repeater which includes: (a) a first optical coupler branching an optical signal from a node of a first optical network into a plurality of optical signals; (b) a plurality of optical filters extracting the plurality of optical signals, respectively; (c) a plurality of optical/electrical converters converting the extracted plurality of optical signals into a plurality of electrical signals, respectively; (d) a plurality of modulators modulating a plurality of optical signals of specific wavelengths with the plurality of electrical signals, respectively; and (e) a second optical coupler multiplexing the plurality of modulated optical signals together into a multiplexed signal which is output to a node of a second optical network.

Objects of the present invention are also achieved by providing an optical repeater which includes: (a) a first optical coupler branching an optical signal from a first optical network into a plurality of optical signals each having a wavelength and bit rate associated with the first optical network; (b) a plurality of optical filters extracting the plurality of optical signals, respectively; (c) a plurality of optical/electrical converters converting the extracted plurality of optical signals into a plurality of electrical signals, respectively; (d) a multiplexer multiplexing the plurality of electrical signals together into a multiplexed signal; and (e) a modulator modulating an optical signal with the multiplexed signal so that the modulated optical signal has a wavelength and bit rate associated with a second optical network and different from the wavelengths and bit rates of said plurality of optical signals, the modulated optical signal being output to the second optical network.

Further, objects of the present invention are achieved by providing an optical repeater which includes (a) an optical/electrical converter converting an optical signal from a first optical network into an electrical signal, the optical signal having a wavelength and bit rate associated with the first optical network; (b) a demultiplexer demultiplexing the electrical signal into a plurality of electrical signals; (c) a plurality of optical modulators optically modulating a plurality of optical signals with the plurality of electrical signals, respectively, to produce a plurality of modulated optical signals each being at a wavelength and bit rate associated with a second optical network and which are different from said wavelength and bit rate associated with the first optical network; and (d) an optical coupler multiplexing the plurality of modulated optical signals together to produce a multiplexed signal which is output to the second optical network.

In addition, objects of the present invention are achieved by providing an optical repeater which includes: (a) a first optical coupler branching an optical signal from a first optical network into a plurality of optical signals each at a wavelength associated with the first optical network; (b) a plurality of optical filters extracting the plurality of optical signals, respectively; (c) a plurality of optical/electrical converters converting the extracted plurality of optical signals into a plurality of electrical signals, respectively; (d) a plurality of modulators modulating a plurality of optical signals with the plurality of electrical signals, respectively, so that the plurality of optical signals are at wavelengths associated with a second optical network and which are different than said wavelengths associated with the first optical network; and (e) a second optical coupler multiplexing the plurality of modulated optical signals together into a multiplexed signal which is output to the second optical network.

BRIEF DESCRIPTION OF THE DRAWINGS

These and other objects and advantages of the invention will become apparent and, more readily appreciated from the following description of the preferred embodiments, taken in conjunction with the accompanying drawings of which.

DESCRIPTION OF THE PREFERRED EMBODIMENTS

Figure 1:
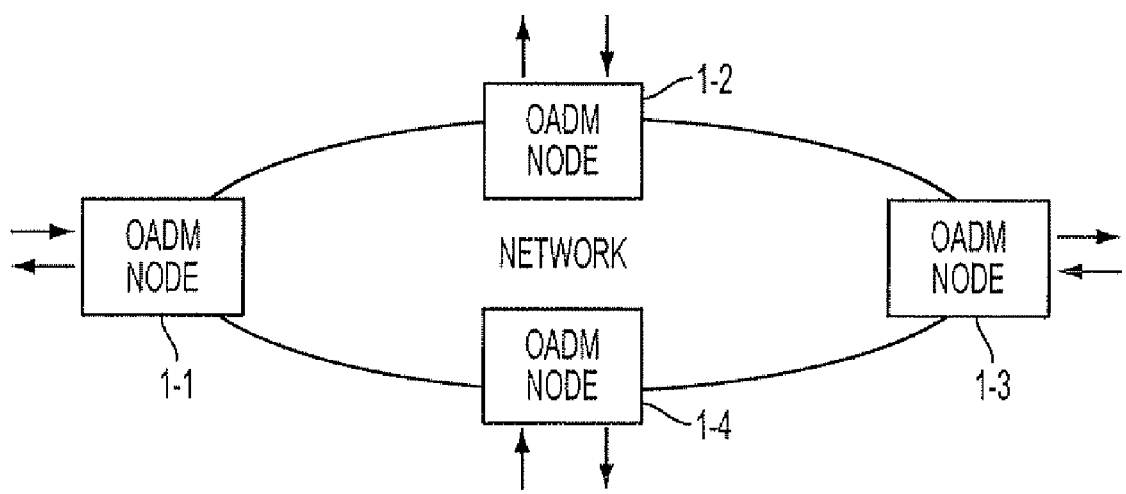
FIG. 1 (prior art) is a diagram illustrating a conventional network architecture.
Figure 2:
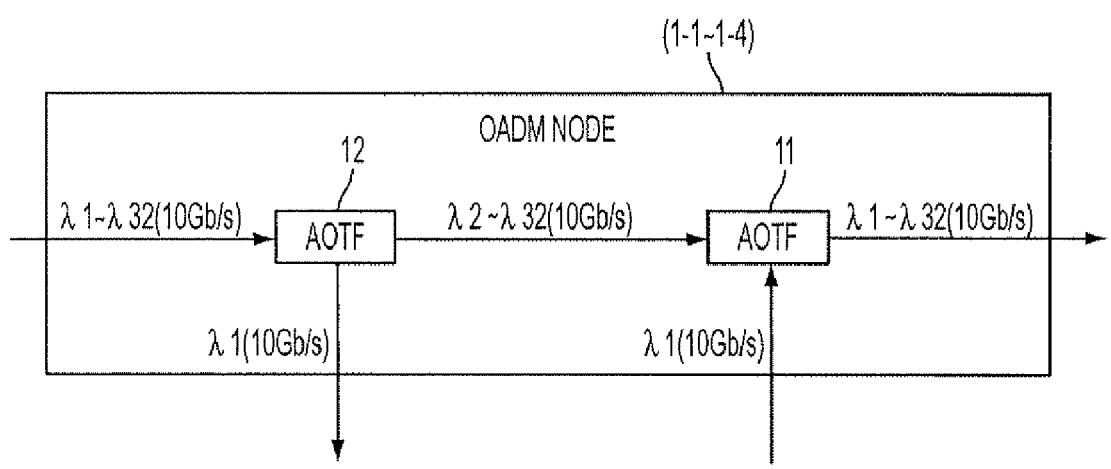
FIG. 2 (prior art) is a diagram illustrating a conventional optical add/drop multiplexer (OADM).

Reference will now be made in detail to the present preferred embodiments of the present invention, examples of which are illustrated in the accompanying drawings, wherein like reference numerals refer to like elements throughout.

Figure 3:
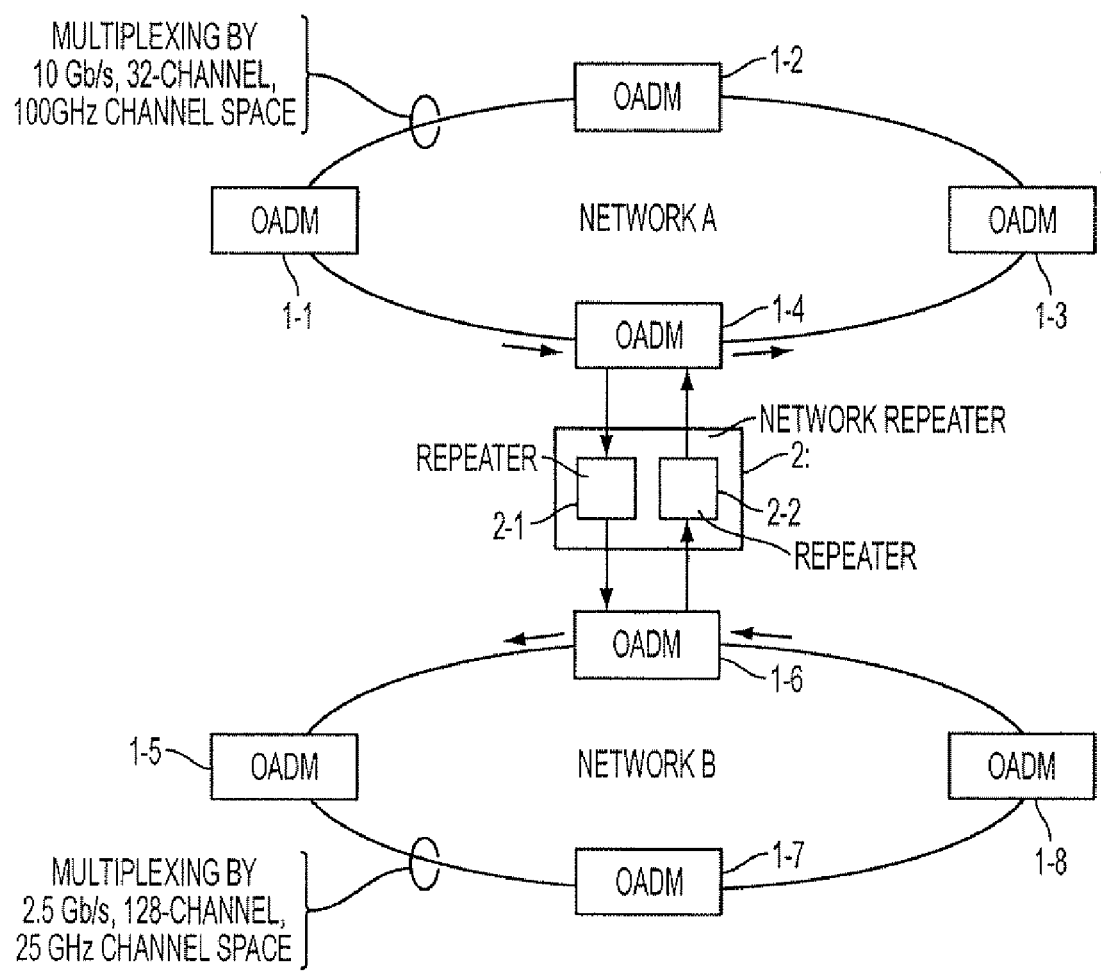
FIG. 3 is a diagram illustrating a network of 10 Gb/s, 32 channels, 100 GHz channel space connected to a network of 2.5 Gb/s, 128 channels, 25 GHz channel space, according to an embodiment of the present invention.

FIG. 3 is a diagram illustrating two networks connected together, according to an embodiment of the present invention. Referring now to FIG. 3, ring network A is formed by connecting OADMs 1-1, 1-2, 1-3 and 1-4 together through a transmission line consisting of an optical fiber. Similarly, ring network B is formed by connecting OADMs 1-5, 1-6, 1-7 and 1-8 together through a transmission line consisting of an optical fiber.

Network A and network B are different in the signal bit rate and signal channel space (wavelength interval). For example, in network A, the bit rate is 10 Gb/s, there are 32 channels with 100 GHz channel space. In network B, the bit rate is 2.5 Gb/s, there are 128 channels with 25 GHz channel space.

Network A and network B are connected together through a network repeater 2. Network repeater includes repeaters 2-1 and 2-2.

Figure 4:
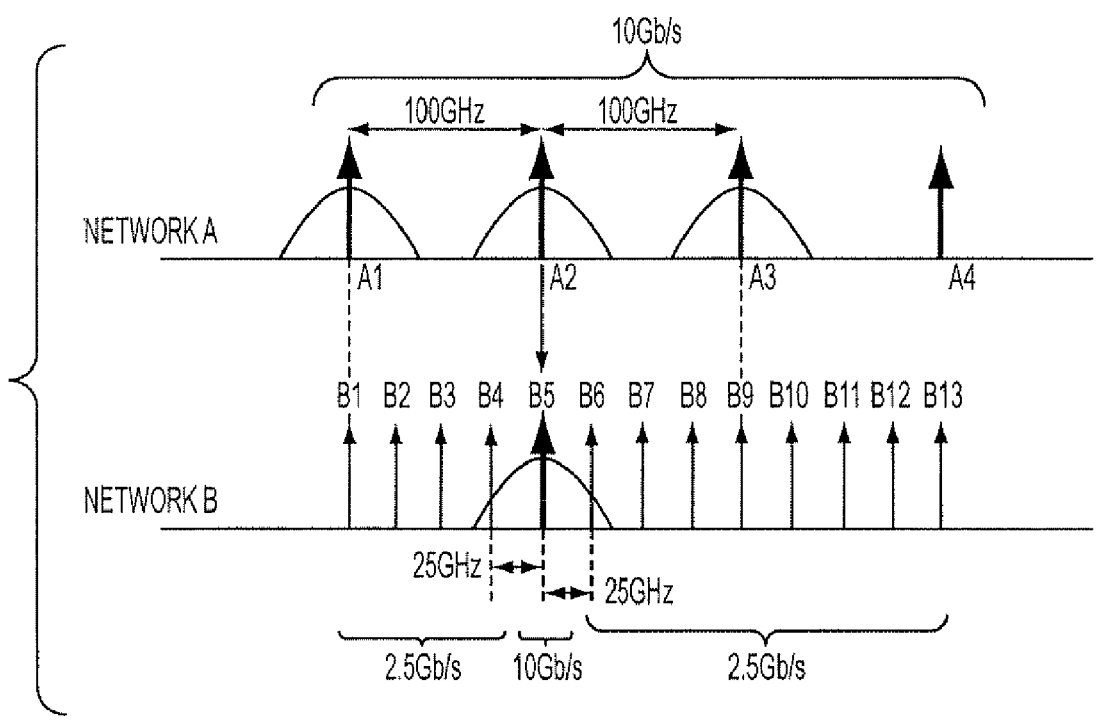
FIG. 4 is a diagram for explaining crosstalk when networks are connected.

When an optical signal from network A is directly connected to network B, the bandwidth ±30 GHz of the 10 Gb/s signal interferes the adjacent channels to generate crosstalk. As a result, the transmission quality may be deteriorated, as illustrated in FIG. 4.

Figure 5:
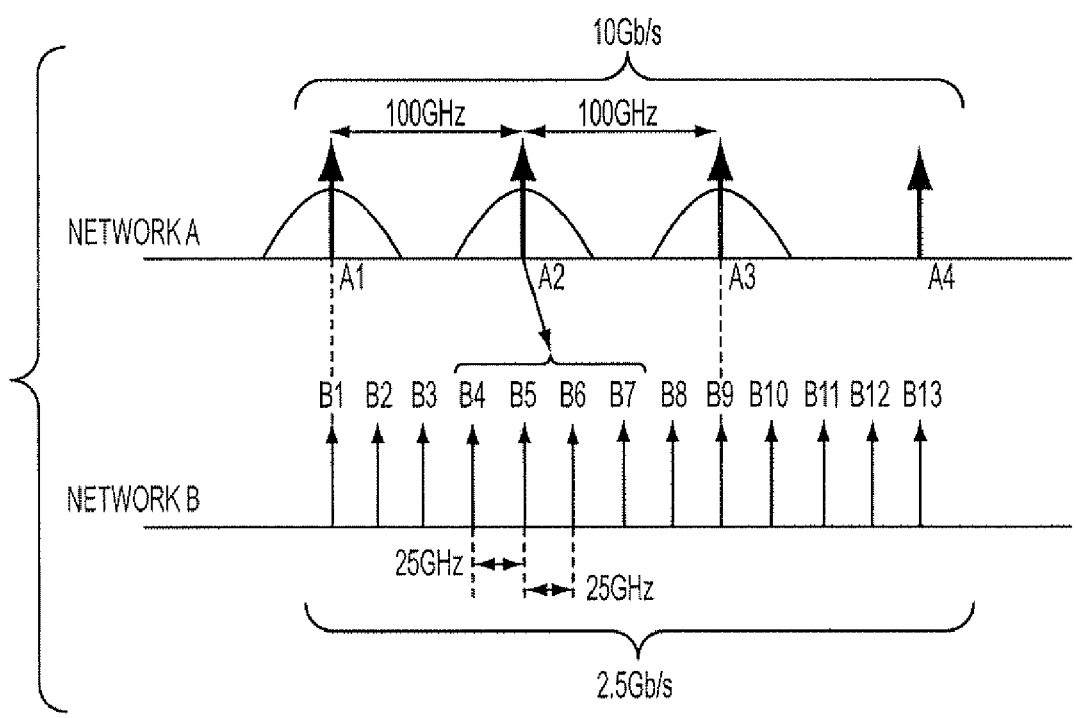
FIG. 5 is a diagram illustrating conversion of signal bit rate and wavelength when networks are connected, according to an embodiment of the present invention.

Referring again to FIG. 3, in repeater 2-1 of network repeater 2, the signal is converted to four signals of 2.5 Gb/s and these signals are then connected to the network B illustrated in FIG. 5.

In this example, the original signal of 10 Gb/s was generated by multiplexing signals of 2.5 Gb/s. Therefore, a speed-down to four signals of 2.5 Gb/s from the signal of 10 Gb/s can easily be realized by demultiplexing the signal to the original electrical signal of 2.5 Gb/s.

Moreover, conversion to four signals of 2.5 Gb/s is performed to provide signal wavelengths previously assigned in network B.

With such conversion, it is now possible to essentially avoid generation of crosstalk to the adjacent channels by the signal frequency width.

On the other hand, when a signal is connected to network A from network B, the signal wavelength from network B is not an assigned wavelength in network A and the signal bit rate is different from that in network A. Therefore, a signal of 2.5 Gb/s and 4 channels from network B is converted to a signal of 10 Gb/s and one channel (that is, to a signal wavelength previously assigned in network A) in repeater 2-2 of network repeater 2. This converted signal is supplied to network A.

Therefore, using a network repeater having operations as explained above, networks in different signal channel space and signal bit rates can be connected together.

Figure 6:
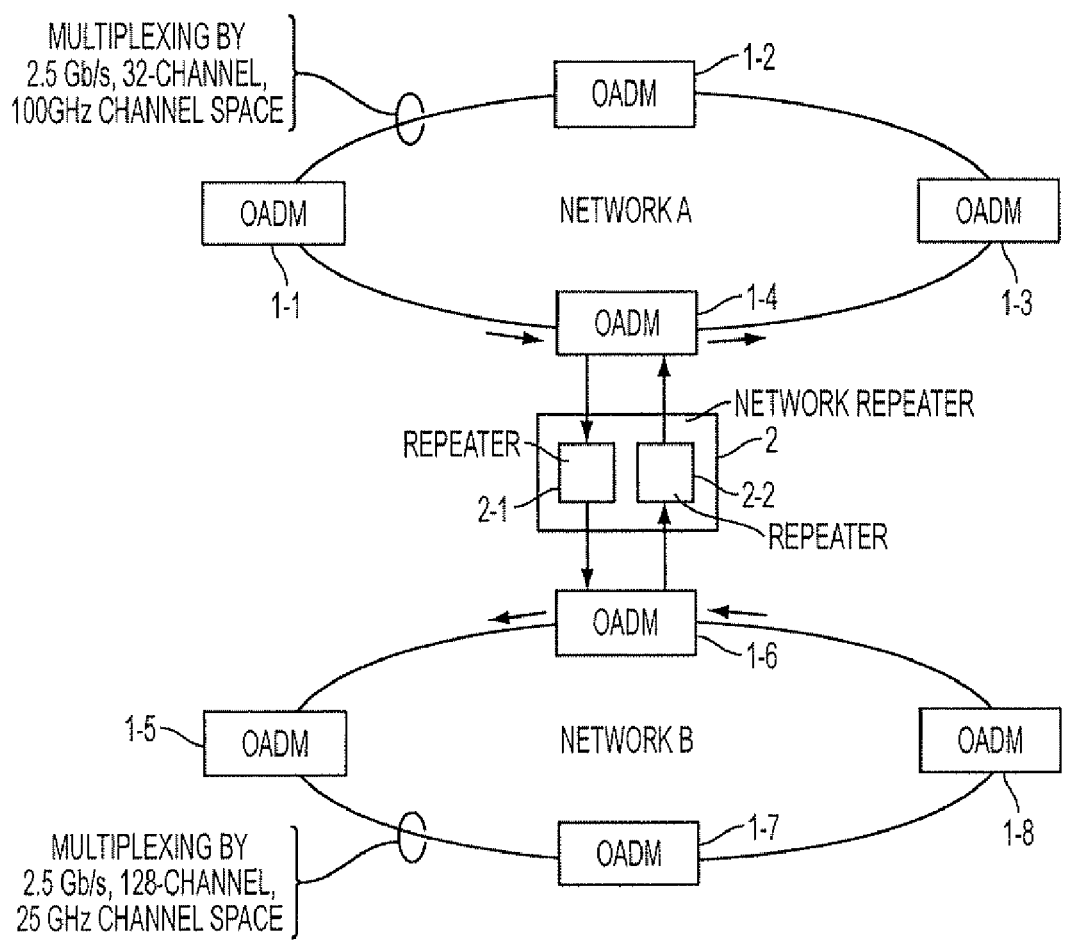
FIG. 6 is a diagram illustrated a network of 2.5 Gb/s, 32 channels, 100 GHz channel space connected to a network of 2.5 Gb/s, 128 channels, 25 GHz channel space, according to an embodiment of the present invention.

FIG. 6 is a diagram illustrating a network configuration where ring networks have identical signal bit rates and different signal channel spaces, according to an embodiment of the present invention. Referring now to FIG. 6, in network A, the signal bit rate is 2.5 Gb/s, there are 32 channels and the channel space is 100 GHz. In network B, the signal bit rate is 2.5 Gb/s, there are 128 channels and the channel space is 25 GHz.

When an optical signal from network B is connected to network A, wavelength may be changed, in a certain case, from the optical signal wavelength which may be identified in network A. In this case, this signal cannot be identified in network B. Bandwidth using the wavelength is different in networks A and B.

However, this problem can be eliminated because network repeater 2 converts the signal wavelength of the optical signal from network A to the previously assigned signal wavelength in network B.

Meanwhile, a similar problem might be generated when the signal is connected to network B from network A. However, the bandwidth of 1.52 μm to 1.59 μm may be used for communication transmission with an ordinary optical fiber and when the signals are allocated in 128 channels and 0.2 nm channel space. Therefore, the optical signal wavelength can be identified in almost every case in network B and the signal wavelength not used in network B is directly output without wavelength conversion by network repeater 2. Therefore, repeater 2-1 is unnecessary in this case.

When it is requested to newly allocate the signal wavelength from the viewpoint of operation of network B, the signal wavelength can be converted by network repeater 2 to a wavelength preferable to network B.

Figure 7:
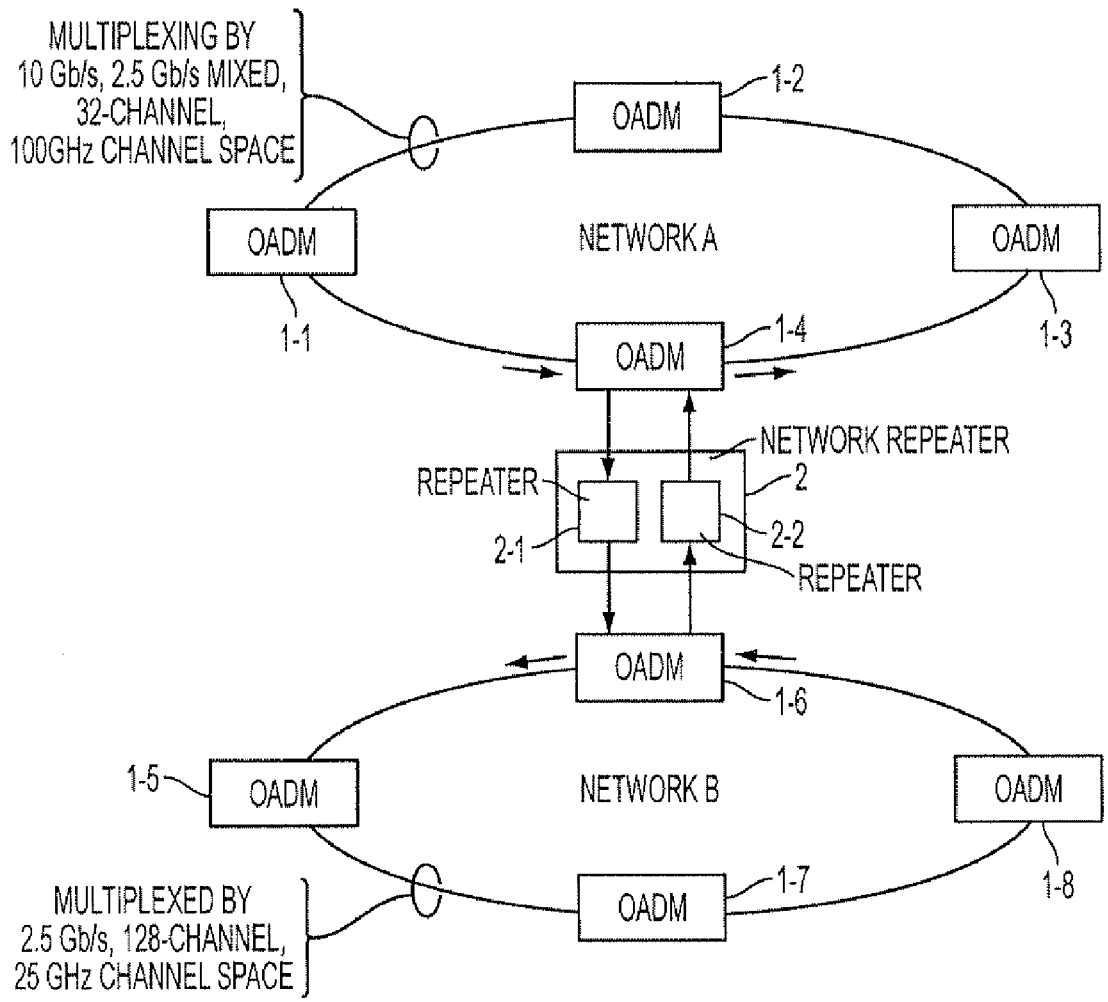
FIG. 7 is a diagram illustrating a network of 10 Gb/s and 2.5 Gb/s, 32 channels, 100 GHz channel space connected to a network of 2.5 Gb/s, 128 channels, 25 GHz channel space, according to an embodiment of the present invention.

FIG. 7 is a diagram illustrating an example of a more complicated network configuration, according to an embodiment of the present invention. Referring now to FIG. 7, in network A, signals include those at 2.5 Gb/s and 10 Gb/s, there are 32 channels and 100 GHz channel space. In network B, the signal bit rate is 2.5 Bb/s, there are 128 channels and 25 GHz channel space.

In this case, signals may be connected mutually with each other by providing network repeater 2 for converting the wavelength and channel space.

Figure 8:
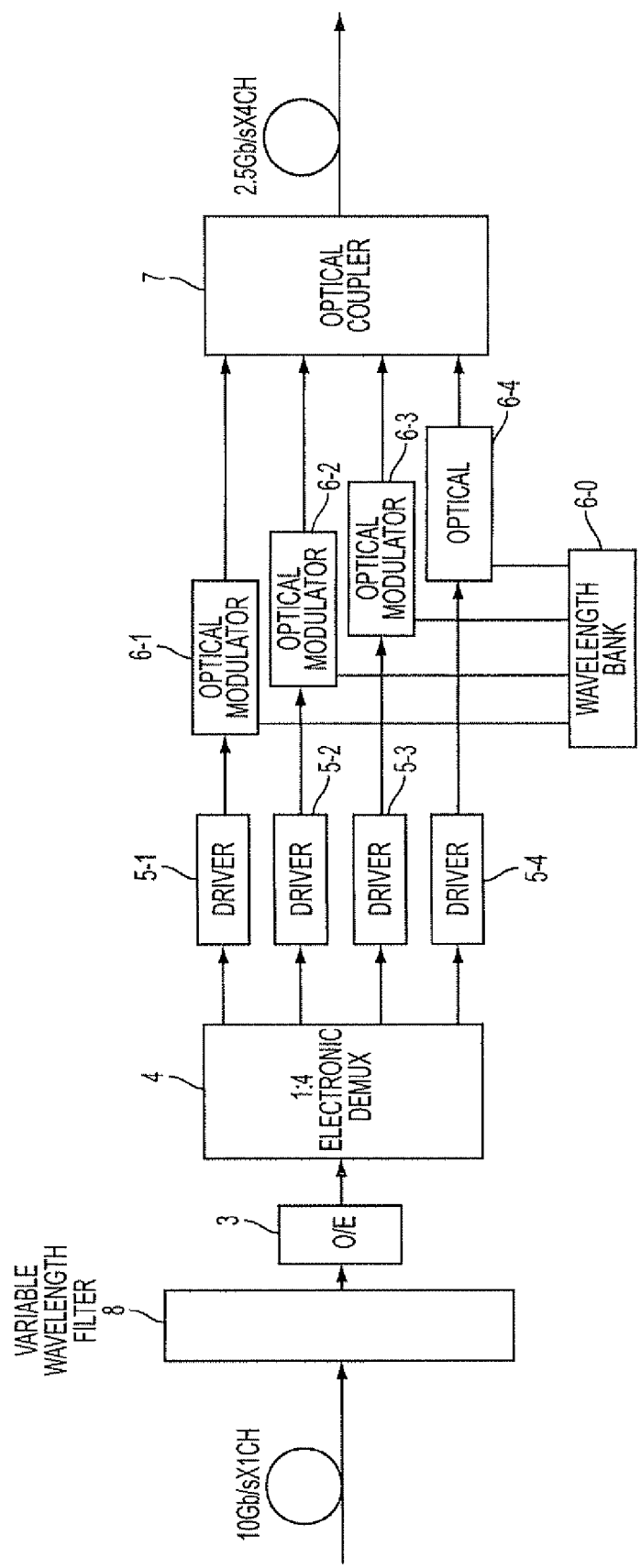
FIG. 8 is a diagram illustrating a repeater, according to an embodiment of the present invention.

FIG. 8 is a diagram illustrating a practical structure of repeater 2-1 of network repeater 2 of FIG. 3, according to an embodiment of the present invention. Repeater 2-1 in FIG. 8 lowers the signal bit rate and simultaneously performs a conversion to increase the number of signal wavelengths to be allocated in view of keeping the amount of information of the original signal.

An example of forming the structure to convert a signal of 10 Gb/s to four channels of 2.5 Gb/s signals will be explained, such as that which might be used with the network configuration of FIG. 3.

Referring now to FIG. 8, repeater 2-1 can realize the function explained above in the case where the repeater is formed of a variable wavelength filter 8, an optical receiving circuit (O/E) 3, an electrical signal branching circuit (DEMUX) 4, drivers 5-1 to 5-4, optical modulators 6-1 to 6-4 having the ability to set a desired wavelength of the output optical signal, wavelength bank 6-0 and optical coupler 7.

First, as an optical input to network repeater 2, an optical signal of the particular wavelength of 10 Gb/s to be input to variable filter 8 is extracted.

An optical output of variable length filter 8 is converted to an electrical signal by optical receiving circuit (O/E circuit) 3.

This signal is demultiplexed to four signals by electrical signal branching circuit (DEMUX) 4 and each electrical signal drives a corresponding optical modulator 6-1, 6-2, 6-3 or 6-4 via drivers 5-1, 5-2, 5-3 or 5-4, respectively, in order to generate four optical signals of 2.5 Gb/s.

In this case, in order to obtain the desired wavelength of optical signal output from optical modulator 6-1, 6-2, 6-6 or 6-4, the desired wavelength is supplied to each modulator by wavelength bank 6-0, and an optical signal is externally modulated by the modulator.

Wavelength bank 6-0 is formed, for example, of a filter (not illustrated) provided with a laser diode (LD) (not illustrated) for a plurality of different wavelengths to multiplex the wavelength of this optical signal, branch the multiplexed signal to a plurality of optical signals and freely change the selected wavelength of the branched signal.

The wavelength of each channel may be formed with the optical signal of desired wavelength by changing the selected wavelength of this filter.

Moreover, it is also possible that, for example, a wavelength variable LD is used for the input optical signal to the optical modulator and this LD is individually connected to the modulator.

As a modulator such as 6-1, 6-2, 6-3 or 6-4, a polarization independent external modulator can be used when the wavelength bank and wavelength variable LD are applied.

Moreover, optical modulators 6-1, 6-2, 6-3 and 6-4 may be the LD itself. In such a case, the LD is driven in direct to emit the light with the outputs of drivers 5-1 to 5-4, in place of using wavelength bank 6-0 and wavelength variable LD or the like.

In this case, it is required to freely change the wavelength of the LD to the particular output wavelength with temperature or bias current, etc. in order to change the wavelength of the LD to the desired wavelength.

Figure 9:
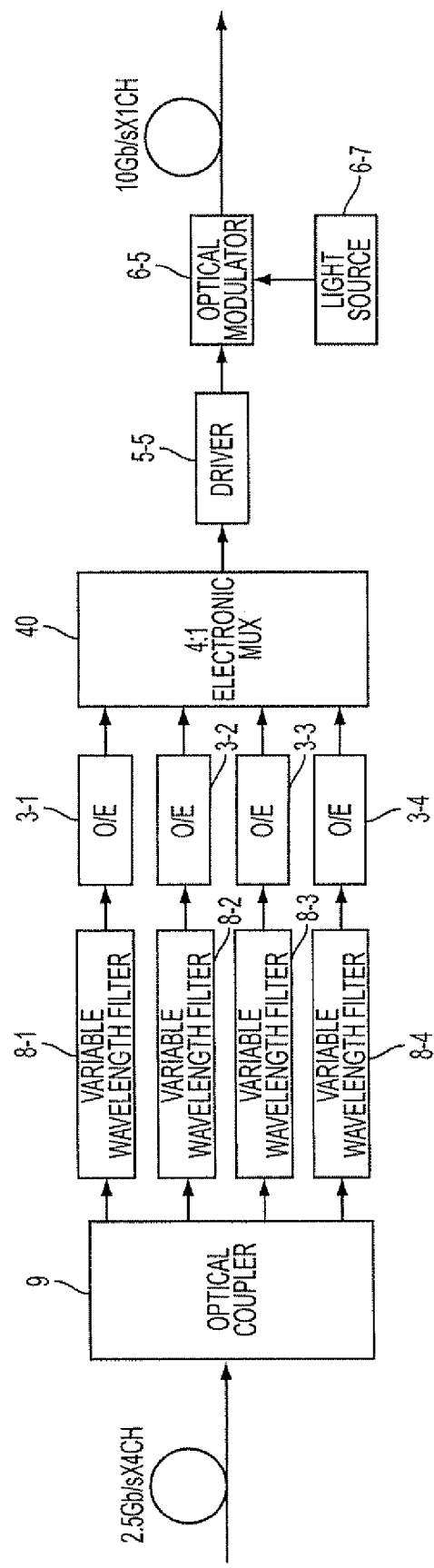
FIG. 9 is a diagram illustrating a repeater, according to an embodiment of the present invention.

FIG. 9 is a diagram illustrating repeater 2-2 of network repeater 2 of FIG. 3 in which the signal bit rate is increased and simultaneously signal wavelength is assigned freely, according to an embodiment of the present invention. As an example, the conversion of a signal of 2.5 Gb/s and four channels into a signal of 10 Gb/s of one channel will be explained, such as that which might occur when transmitting an optical signal from network B to network A in FIG. 3.

Referring now to FIG. 9, repeater 2-2 can realize the operations explained above when it is formed of an optical coupler 9, variable wavelength filters 8-1, 8-2, 8-3 and 8-4, optical receiving circuits (O/E) 3-1, 3-2, 3-3 and 3-4, an electrical signal multiplexer (MUX) 40, a driver 5-5, an optical modulator 6-5 and a light source 6-7. Optical modulator 6-5 can freely set the wavelength of an output optical signal which is output from optical modulator 6-5.

First, four optical signals of 2.5 Gb/s are branched by optical coupler 9 and one wavelength is respectively extracted for every channel by variable wavelength filters 8-1, 8-2, 8-3 and 8-4.

The extracted one wavelength signal of 2.5 Gb/s is converted to an electrical signal by optical receiving circuits 3-1, 3-2, 3-3 and 3-4.

These four electrical signals of 2.5 Gb/s are multiplexed by 4:1 electric multiplexer 40 to form only one electrical signal of 10 Gb/s.

This electrical signal drives optical modulator 6-5 via driver 5-5 to form the optical signal of one wavelength of 10 Gb/s.

In this cases light source 6-7 supplies an optical signal of desired wavelength to modulator 6-5 with the wavelength bank and wavelength variable LD illustrated in FIG. 8 so that an optical output signal from optical modulator 6-5 can be set to the desired optical wavelength.

Modulator 6-5 may be, for example, a polarization independent external modulator when the wavelength bank and wavelength variable laser are applied as in FIG. 8.

When an LD can be driven even in the 10 Gb/s without charping owing to technical progress, the modulator may be formed by an LD itself as is explained in regard to FIG. 8.

Figure 10:
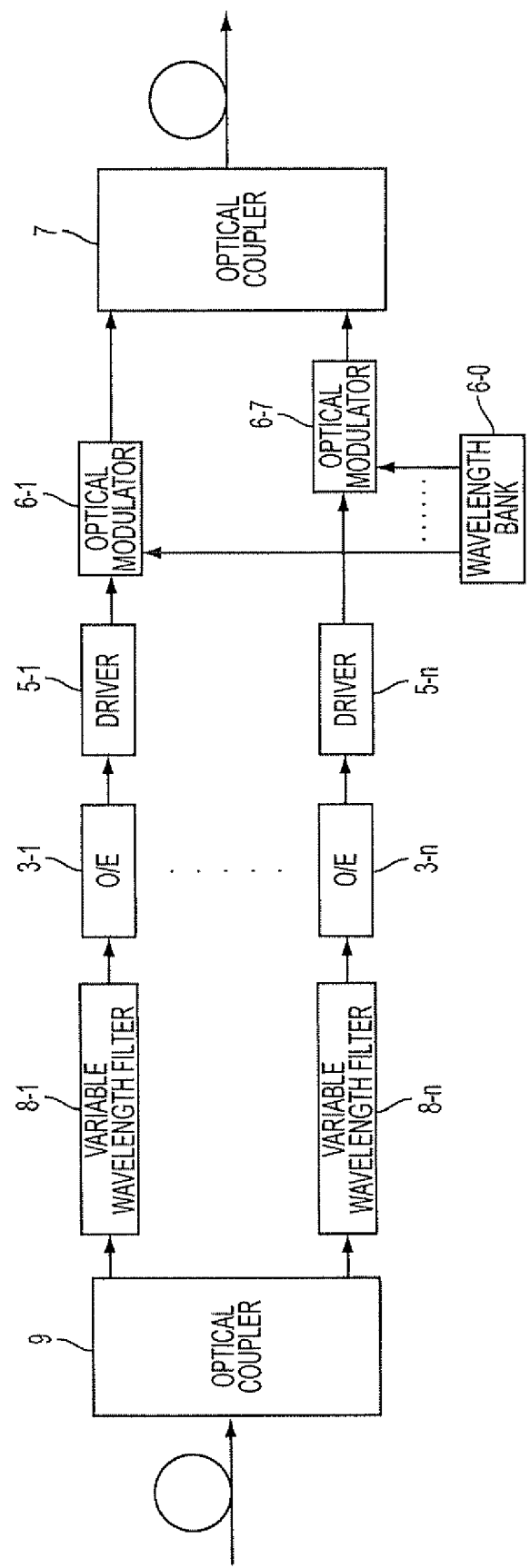
FIG. 10 is a diagram illustrating a repeater, according to an embodiment of the present invention.

FIG. 10 is a diagram illustrating repeaters 2-1, 2-2 of network repeater 2 for converting at a time a plurality of desired wavelength signals in the signal wavelength sequence of a certain signal channel space as illustrated in FIG. 6 to the desired wavelength signal in the signal wavelength sequence in different signal channel spaces.

As an example, a structure can convert the desired signals (n signals) in the signal sequence of 100 GHz channel space to the desired signals (n signals) in the signal sequence of 25 GHz channel space.

Referring now to FIG. 10, repeaters 2-1, 2-2 include an optical coupler 9, variable wavelength filters 8-1 to 8-n, optical receiving circuits (O/E) 3-1 to 3-n, drivers 3-1 to 3-n, optical modulators 6-1 to 6-n, wavelength bank 6-0 and optical coupler 7. Optical modulators 6-1 to 6-n can freely set the wavelength of a optical signal output therefrom.

First, the optical signal consisting of signal sequence of 100 GHz channel space is branched by optical coupler 9. The optical signals branched by optical coupler 9 are respectively input to variable wavelength filters 8-1 to 8-n and only the optical signal of the predetermined wavelength to be converted is extracted.

This extracted optical signal of single wavelength is converted respectively to electrical signals by optical receiving circuits 3-1 to 3-n. These electrical signals drive optical modulators 6-1 to 6-n, respectively, via drivers 5-1 to 5-n, respectively, to form optical signals of signal wavelength consisting of different signal channel space sequence.

In this case, a signal is supplied to modulators 6-1 to 6-n by wavelength bank 6-0 so that the desired optical wavelength can be obtained.

It is also possible, here, to form the structure that a wavelength variable LD is connected individually to modulators 6-1 to 6-n in place of wavelength bank 6-0.

Modulators 6-1 to 6-n may be polarization independent external modulators when a wavelength bank and wavelength variable laser are applied.

Moreover, a LD may also be directly driven with drivers as in the case of FIG. 8 and FIG. 9.

Network repeater 2 of FIG. 7 can be formed by selecting the repeaters in FIG. 8 and/or FIG. 10 used individually or in combination.

The structures in FIG. 8 to FIG. 10 have both wavelength converting functions and bit rate converting functions, but if the relationship between the input signal and wavelength requires only the wavelength converting function, the signal can be modulated in the identical bit rate without using the bit rate converting function, and it is then output.

Moreover, if only the bit rate converting function is necessary, the wavelength identical to the input optical wavelength may be used.

When networks of different wavelength channel space and signal bit rate are connected, signal-to-signal crosstalk can be eliminated by extracting the optical signal of desired wavelength in the network and then converting the wavelength and bit rate for connection to the other networks. Moreover, thereby, deterioration of signal can be prevented and a degree of freedom in design of the network can be improved through allocation of wavelength to the desired area.

According to the above embodiments of the present invention, an optical repeater connects between nodes of optical networks. The optical repeater includes a repeating medium for transmitting an optical signal from a first optical network to a second optical network. Moreover, the repeating medium includes a wavelength converter converting a wavelength of the optical signal to the a wavelength for the second optical network, and a bit rate converter converting bit rate of the optical signal to a bit rate for the second optical network.

In the present invention, an optical signal of the desired wavelength in a network is extracted and wavelength and/or bit rate of the signal is converted and then connected to another network having different wavelength channel space and/or signal bit rate. Thereby, signal-to-signal crosstalk, which is generated due to the difference of signal allocation and bit rate between the networks when networks of different wavelength and bit rate are connected for realize optical communication, may be prevented.

Particularly, embodiments of the present invention will be significant in realizing future, large scale photonics networks.

According to the above embodiments of the present invention, an intra-network repeater enables flexible connection between optical networks having different signal velocity (bit rate) and signal channel space.

Typically, all the elements in a network repeater, such as network repeater 2-2 in FIG. 3, would be enclosed together in a housing so that the repeater could be considered to be a "unit." For example, such a unit would include repeaters 2-1 and 2-2 (each may include, for example, any of the embodiments shown in FIGS. 8, 9 or 10) enclosed together in a housing as a repeater "unit."

Moreover, the components of each individual repeater 2-1 or 2-1 could be enclosed together in a housing so that such a repeater could be considered to be a "unit." For example, in FIG. 10, optical coupler 9, variable wavelength filters 8-1 to 8-n, optical receiving circuits (O/E) 3-1 to 3-n, drivers 3-1 to 3-n, optical modulators 6-1 to 6-n, wavelength bank 6-0 and optical coupler 7 could be enclosed together in a housing so that the repeater could be considered to be a "unit." In a similar manner, the components in FIGS. 8 and 9 could be enclosed together in a housing as a unit.

Various types of modulators are described herein for use with the present invention. There are many different types of modulators, and the present invention is not limited to any particular type of modulator.

Various examples are described herein of networks having a specific bit rate, channel space, and number of channels. However, the present invention is not limited to these specific examples, and is applicable to networks have many different possible combinations and different values of bit rate, channel space and number of channels.

Although a few preferred embodiments of the present invention have been shown and described, it would be appreciated by those skilled in the art that changes may be made in these embodiments without departing from the principles and spirit of the invention, the scope of which is define din the claims and their equivalents.

The invention claimed is:

1. An optical repeater comprising:
   a first optical coupler branching an optical signal from a node of a first optical network into a plurality of optical signals;
   a plurality of optical filters extracting the plurality of optical signals, respectively;
   a plurality of optical/electrical converters converting the extracted plurality of optical signals into a plurality of electrical signals, respectively;
   a plurality of modulators modulating a plurality of optical signals of specific wavelengths with the plurality of electrical signals, respectively; and
   a second optical coupler multiplexing the plurality of modulated optical signals together into a multiplexed signal which is output to a node of a second optical network.

2. An optical repeater as in claim 1, wherein the extracted plurality of optical signal are each at a wavelength associated with the first optical network, and the plurality of modulated optical signals are each at a wavelength associated the second optical network.

3. An optical repeater as in claim 2, wherein the wavelengths of the extracted plurality of optical signals associated with the first optical network are different than the wavelengths of the modulated optical signals associated with the second optical network.

4. An optical repeater comprising:
   a first optical coupler branching an optical signal from a first optical network into a plurality of optical signals each at a wavelength associated with the first optical network;
   a plurality of optical filters extracting the plurality of optical signals, respectively;
   a plurality of optical/electrical converters converting the extracted plurality of optical signals into a plurality of electrical signals, respectively;
   a plurality of modulators modulating a plurality of optical signals with the plurality of electrical signals, respectively, so that the plurality of optical signals are at wavelengths associated with a second optical network and which are different than said wavelengths associated with the first optical network; and
   a second optical coupler multiplexing the plurality of modulated optical signals together into a multiplexed signal which is output to the second optical network.

5. An optical repeater comprising:
   a wavelength converter converting a wavelength of an optical signal from a first optical network to a wavelength of a second optical network; and
   a bit rate converter converting a bit rate of the optical signal from the first optical network to a bit rate of the second optical network, wherein the optical repeater transmits the optical signal from the first optical network to the second optical network at the converted bit rate and converted wavelength, and the optical repeater is connected between a node of the first optical network and a node of the second optical network so that the optical signal is transmitted from the first optical network to the second optical network by passing from the node of the first optical network, then through the optical repeater, and then through the node of the second optical network, wherein the wavelength converter and the bit rate converter together comprise
   a first optical coupler branching the optical signal from the first optical network into a plurality of optical signals, a plurality of optical filters extracting the plurality of optical signals, respectively;

a plurality of optical/electrical converters converting the extracted plurality of optical signals into a plurality of electrical signals, respectively, a plurality of modulators modulating a plurality of optical signals of specific wavelengths with the plurality of electrical signals, respectively, and a second optical coupler multiplexing the plurality of modulated optical signals together into a multiplexed signal which is output to the second optical network at the converted bit rate and converted wavelength.

6. A communication system comprising:

a first optical network;

a second optical network; and a repeater connected between a node of the first optical network and a node of the second optical network, the repeater including a wavelength converter converting a wavelength of an optical signal from the node of the first optical network to a wavelength of a second optical network, the optical repeater transmitting the optical signal from the first optical network to the node of the second optical network at the converted wavelength, and a bit rate converter converting a bit rate of the optical signal from the node of the first optical network to a bit rate of the second optical network, the optical repeater transmitting the optical signal from the first optical network to the second optical network at the converted bit rate, wherein the wavelength converter and the bit rate converter together comprise a first optical coupler branching the optical signal from the first optical network into a plurality of optical signals, a plurality of optical filters extracting the plurality of optical signals, respectively, a plurality of optical/electrical converters converting the extracted plurality of optical signals into a plurality of electrical signals, respectively, a plurality of modulators modulating a plurality of optical signals of specific wavelengths with the plurality of electrical signals, respectively, and a second optical coupler multiplexing the plurality of modulated optical signals together into a multiplexed signal which is output to the second optical network at the converted bit rate and converted wavelength.

* * * * *